Dec. 29, 1942.   S. A. FORTER ET AL   2,306,721
GLASS FABRICATING MACHINERY
Filed Sept. 29, 1941   5 Sheets-Sheet 2
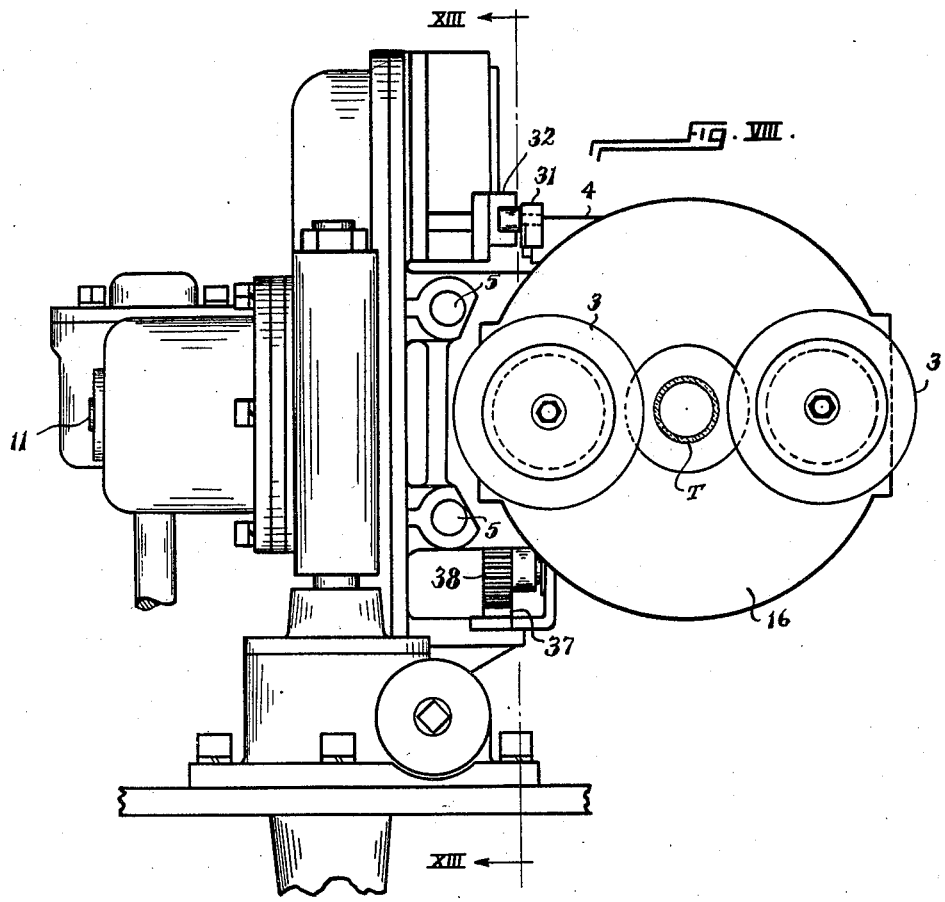
Fig. VIII.
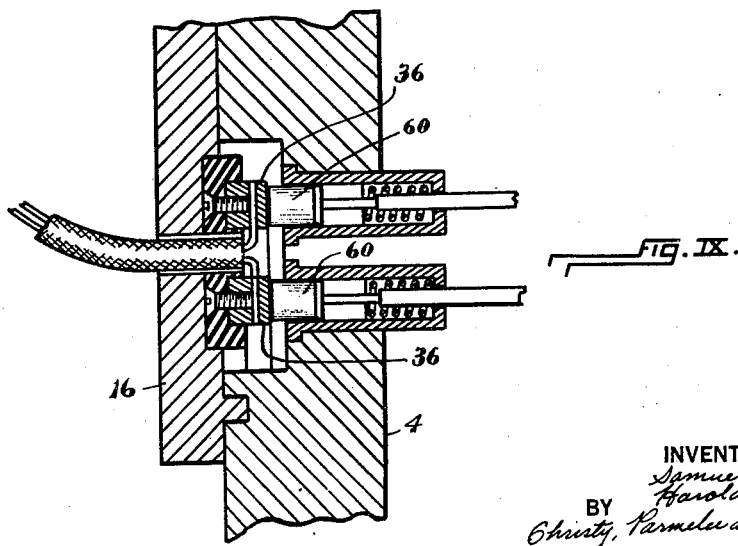
Fig. IX.
INVENTORS
Samuel A. Forter
Harold H. Snyder
BY Christy, Parmelee and Strickland
ATTORNEYS Dec. 29, 1942.   S. A. FORTER ET AL   2,306,721
GLASS FABRICATING MACHINERY
Filed Sept. 29, 1941   5 Sheets-Sheet 3
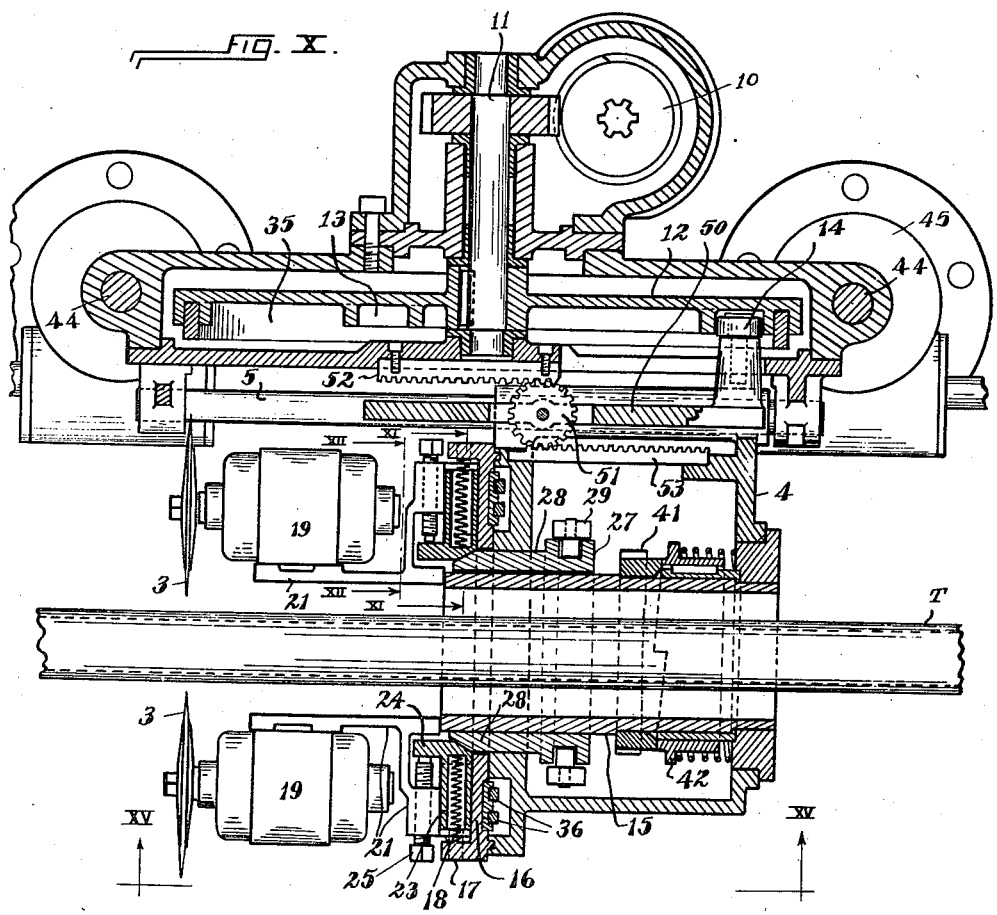
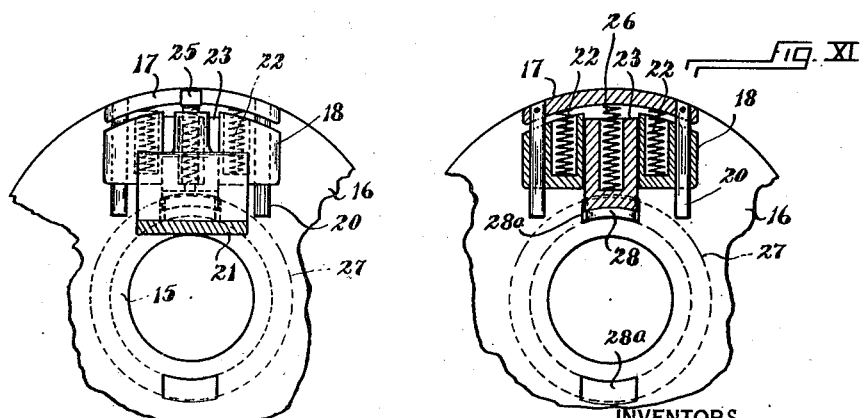
INVENTORS
Samuel A. Forter
Harold H. Snyder
BY Christy, Parmelee and Strickland
ATTORNEYS Dec. 29, 1942.  S. A. FORTER ET AL  2,306,721
GLASS FABRICATING MACHINERY
Filed Sept. 29, 1941  5 Sheets-Sheet 4
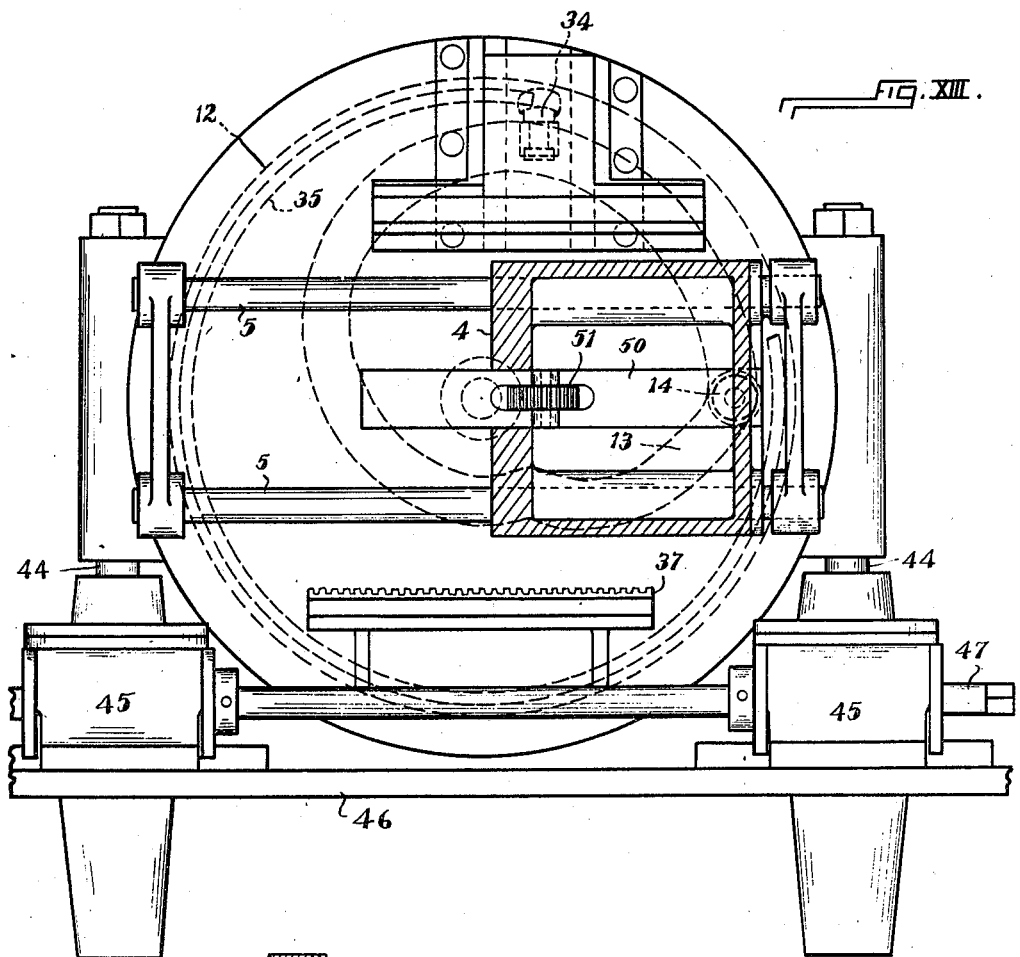
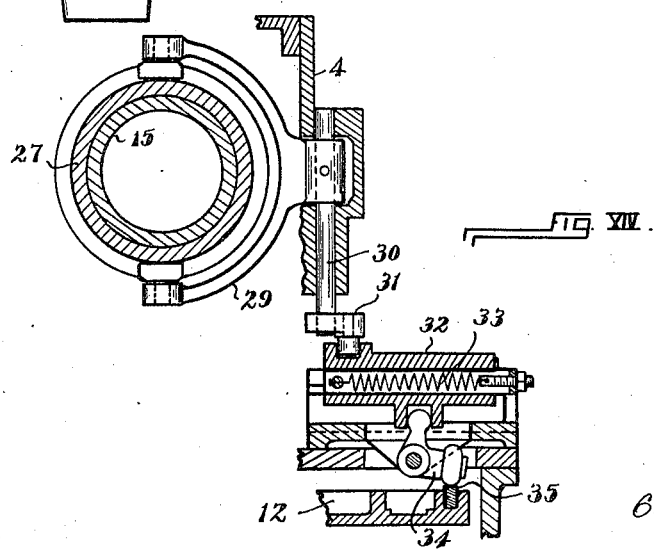
INVENTORS
Samuel A. Forter
Harold H. Snyder
BY Christy, Parmelee and Strickland
ATTORNEYS Dec. 29, 1942.   S. A. FORTER ET AL   2,306,721
GLASS FABRICATING MACHINERY
Filed Sept. 29, 1941   5 Sheets—Sheet 5
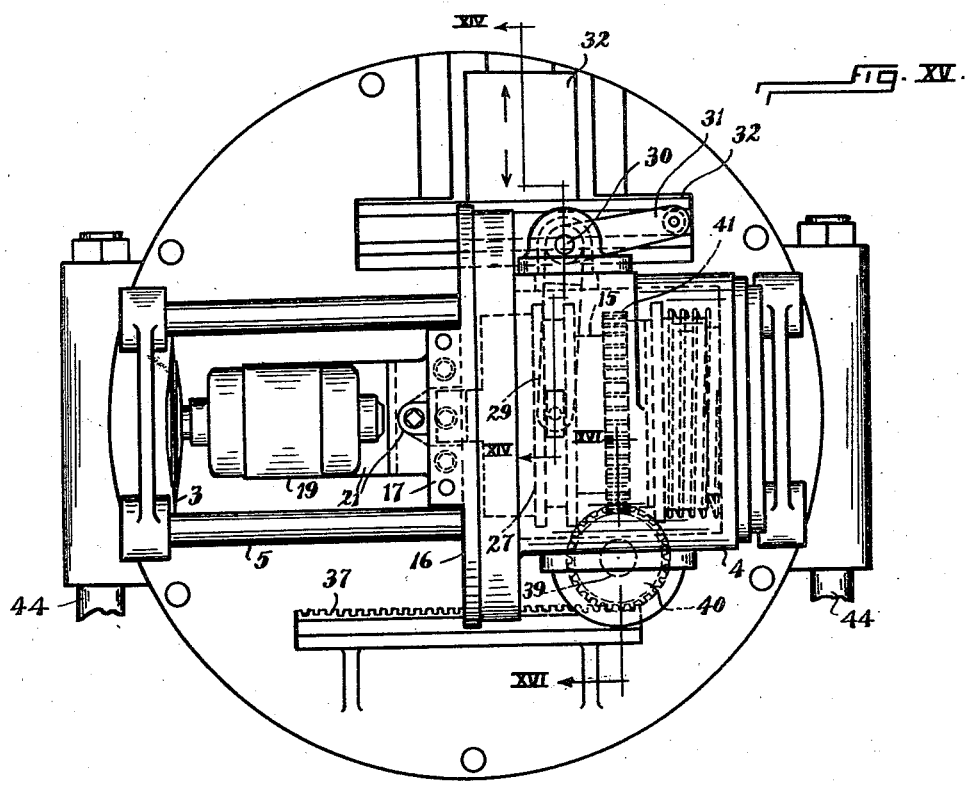
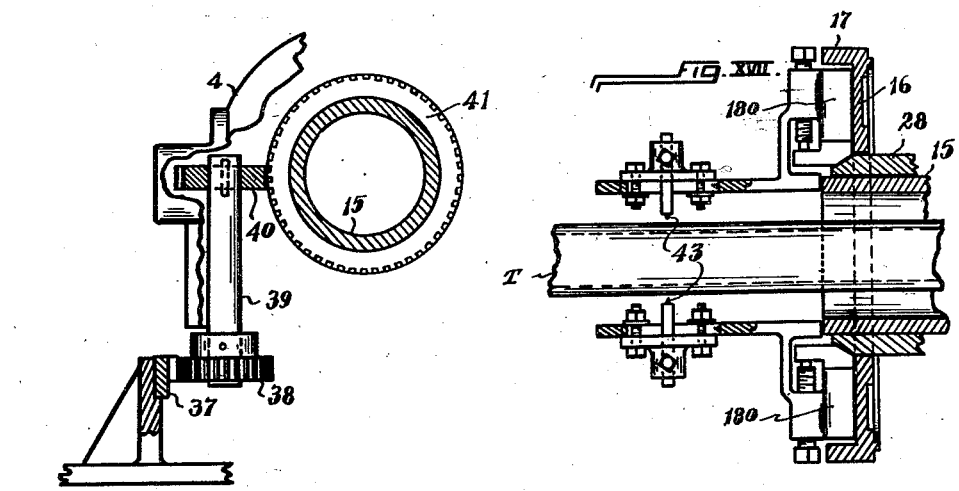
INVENTORS
Samuel A. Forter
Harold H. Snyder
BY Christy, Parmelee and Strickland
ATTORNEYS Patented Dec. 29, 1942

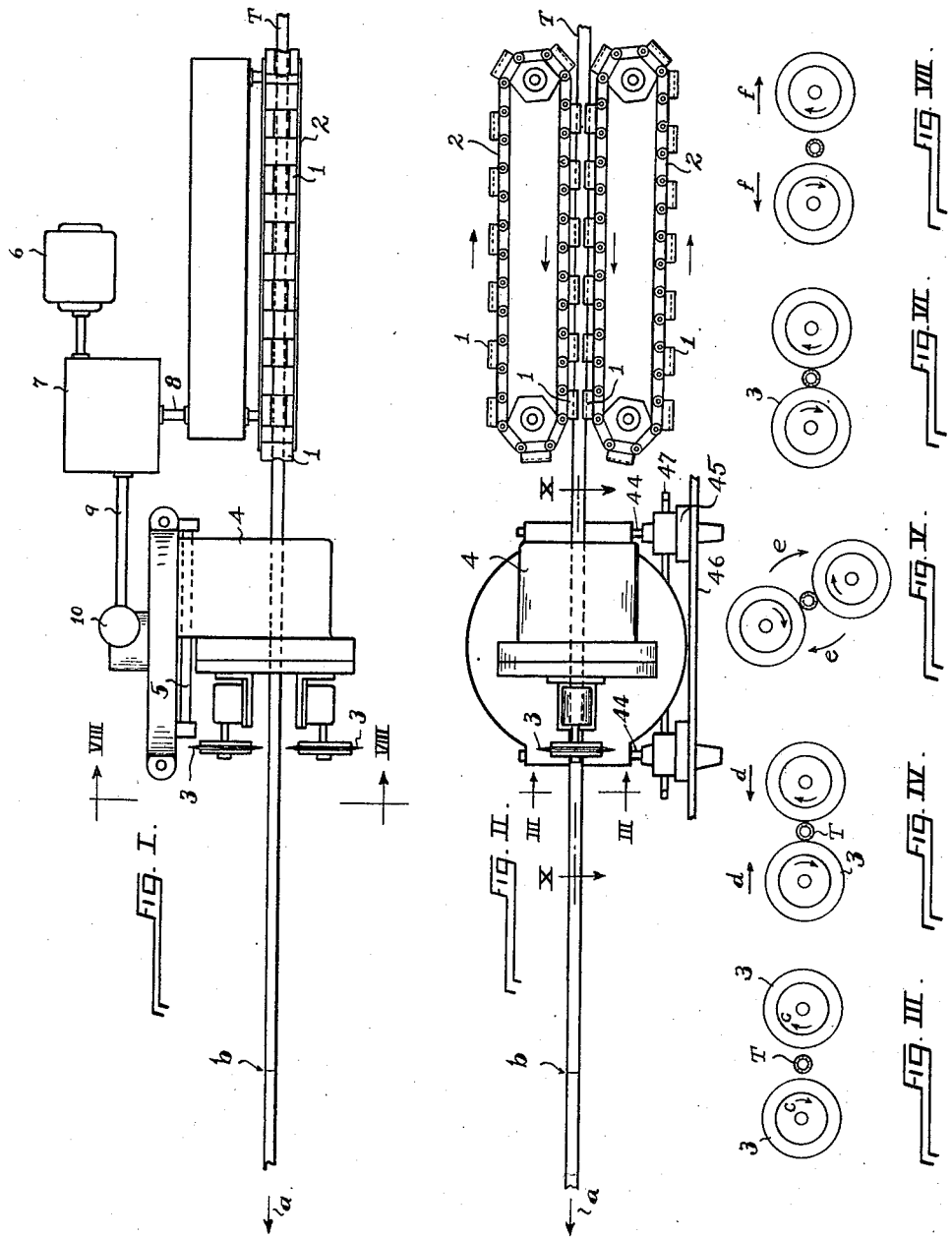

2,306,721

UNITED STATES PATENT OFFICE 2,306,721

GLASS FABRICATING MACHINERY

Samuel A. Forter, Avalon, and Harold H. Snyder, Mount Lebanon, Pa., assignors to Forter-Teichmann, a corporation of Pennsylvania Application September 29, 1941, Serial No. 412,788

10 Claims. (Cl. 49—48)

This invention relates to glass-fabricating machinery, and consists in improvements in a machine for severing a glass product of relatively great or of indefinite or of continuous length, such as glass tubing or rod, into a succession of short articles of definite and predetermined length. It has been a fault of machines heretofore employed for the purpose, that the plane of the severing is not uniformly and accurately transverse to the material under operation, and that in consequence the product of the machine has required, for most purposes, inspection and finishing, and there has been appreciable waste of material and inaccuracy in the ultimate length of the severed articles. The machine of the invention, operating upon the material fed to it in great and indefinite length, severs it with precision on planes that are accurately transverse, and affords as its product a succession of minutely uniform and accurately predetermined lengths, and this without such wastage as has been involved in the finishing of the inexactly severed lengths that earlier machines afforded.

In the accompanying drawings Fig. I is a view in plan, and Fig. II a view in side elevation of the machine of the invention. Figs. III–VII are diagrammatic views showing in section a length of tubing and in elevation the associated pair of cutters, and illustrating in the sequent positions of the cutter relatively to the work in the operation of severing the tube. The uniform plane of section of Figs. III–VII is indicated at III—III, Fig. II. Fig. VIII is a view to larger scale, showing again the work in section and in elevation the machine in its entirety. The plane of section of Fig. VIII is indicated at VIII—VIII, Fig. I. Fig. IX is a view to yet larger scale showing in detail the brush contact through which motors that are carried in planetary revolution about the axis of the advancing work are constantly energized. Fig. X is a view to like scale with Fig. VIII showing the machine in section on the horizontal plane X—X, Fig. II, with which the axis of the advancing work is coincident. Figs. XI and XII are fragmentary views illustrating on adjacent planes of section (transverse to the axis of the work) the means by which minute adjustment of the severing tools is effected; the planes of section are indicated in Fig. X at XI—XI and XII—XII, respectively. Fig. XIII is a view in longitudinal section, on the plane indicated at XIII—XIII, Fig. VIII. Fig. XV is a view of the machine in elevation, seen as indicated at XV—XV, Fig. X. Figs. XIV and XVI are fragmentary views in section, on the planes indicated at XIV—XIV and XVI—XVI, Fig. XV. Fig. XVII is a fragmentary view, corresponding to Fig. X, and showing the severing means in alternative form.

Referring, first, to Figs. I and II, an indefinite length of glass material (by way of example, glass tubing) T advances through the machine from right to left in continuous progress and in straight-line course, indicated by the arrow $a$. The means of advancing the material are here shown to consist, as is usual, in cooperative pairs of friction blocks 1 mounted upon power-driven endless sprocket chain 2, 2. It is the function of the machine to engage the advancing work, to cut it at predetermined intervals by a succession of circumferential score-lines or incisions $b$, and so to sever the length progressively into a plurality of short lengths. The severing instruments are essentially glass-scoring instruments; they may be, and ordinarily will be, of hard material, such as tool-steel, that, rotating at high speed and advancing circumferentially around the tube, score it and weaken it in the plane of the circumferential score-line, so that it easily breaks upon such weakened plane. Manifestly, the disks might be formed of abrasive material, to sink themselves by attrition more or less deeply into the substance of the glass, so as both to weaken and to sever or partially sever the length of material; and in this latter case the tools might, by elaboration of the machine in obvious manner, be given a small and sufficient movement toward the axis of the work as, advancing with the work and in the direction of its axis, they perform their abrasive action.

The scoring tools, in the form shown in Figs. I–VII, X, and XV, are found in disks 3. They are provided in plural number. As here shown, there are two of them. They are symmetrically arranged with reference to the work, and they serve mutually to support the work when under stress of cutting. Manifestly two, three, or more tools may be so grouped in a cluster, surrounding and engaging the work.

As has been said, the cluster of tools advances with the work, performing the cutting operation in the course of such advance. Figs. I and II show the disks at the right-hand end of such range, and it will be understood that from the position shown the disk assembly advances with the work in right-to-left direction, and, when the severing operation is completed, returns again from left to right to the position shown. Throughout all the operation the disks are in rotation, each upon its own axis and in constant direction—clockwise, as seen in Figs. III and VII, and as indicated by the arrows c. Figs. III–VII show also the sequent relative positions of the disks. Beginning with the disks at the right-hand end of their range, and spaced apart and free of engagement with the work, as in Figs. I and III they are shown to be, they first advance in the directions indicated by arrows d, until they close upon and engage the work, as shown in Fig. IV. When the disks so attack the work the right-to-left advance of the disk cluster with the work begins, and at the same time the cluster begins to rotate in planetary course, in clockwise direction, as indicated by arrows e, Fig. V. Such simultaneous right-line advance and planetary revolution continues until the cluster has turned through a range of 180°, and has come to the position illustrated in Fig. VI. Planetary revolution is then arrested, and the cluster opens, the disks receding in the directions indicated by the arrows f, Fig. VII. With the disks so removed from the work and separated, the cluster recedes in left-to-right course, Fig. I, and comes again to initial position. The cycle is then repeated. These are the motions: (1) right-line reciprocation of the tool cluster, in the direction of the axis of the work; (2) constant rotation of the disks, in clockwise direction, as seen in Figs. III–VII; (3) simultaneous and alternate advance and recession of the cluster of disks, radially with respect to the axis of the work; (4) intermittent planetary revolution of the clustered disks, in clockwise direction as seen in Figs. IV and V and through successive ranges of 180° of turning. When the disks are in their radially advanced position the cluster revolves; when in receded position revolution is arrested.

The disk cluster is mounted in a carriage 4, Figs. X and XIII, that slides upon ways 5, mounted in a suitable bed or frame. Obviously carriage travel must be accurately synchronized with the advance of the work, and to that end it is advantageous to drive the sprocket chains 2 and the carriage 4 from a common source of power and through suitably accommodated lines of transmission. In Fig. I a motor 6 is diagrammatically indicated; and from it and through suitable gearing within a gear chest 7 two shafts 8 and 9 are driven at suitable predetermined relative speeds. Shaft 8 is the drive shaft for the sprocket chains, and from shaft 9 the carriage 4 is caused to reciprocate in fixed periodicity and to advance in synchronism with sprocket-chain advance. The shaft 9 through the worm gear 10 (Figs. I and X) drives a shaft 11 that is mounted for rotation in the bed or frame of the machine; and shaft 11 carries a disk 12. The face of the disk 12 is shaped to a cam groove 13, and in this cam groove a stud 14 upon a slide 50 is engaged (cf. Fig. XIII). Rotation, then, of the disk effects reciprocation of the slide 50—one complete advance and return of the slide with each rotation of the disk—and the particular shape and disposition of the groove with respect to the centre of turning of the disk determines the range and the speed of advance (and of recession) of the slide. The slide 50 is mounted in a suitable slideway formed to receive it in the carriage 4. Upon the slide 50 is mounted a pinion 51. The pinion 51 is in simultaneous mesh with a rack 52 mounted upon the bed or frame of the machine and a rack 53 mounted upon the carriage itself. It will be seen on considering Fig. X that reciprocation of the slide 50 effects through the instrumentalities described the advance and recession of carriage 4 at twice the rate of advance and recession of the slide 50.

Rotatably mounted in the carriage 4 is a hollow shaft 15, and through the shaft 15 the work T advances coaxially, as best seen in Fig. X. The shaft carries integrally at one end (the left-hand end, as seen in Fig. X) an outward extending annulus 16 that terminates peripherally in a flange 17—a flange that in this case is shown to be incomplete, and in its extent sufficient only to serve the ends to be described.

Borne by the annulus 16 and movable radially with respect to the axis of shaft rotation are a plurality of blocks 18. The glass-severing disks 3 are carried upon the shafts of electric motors 19. Each motor is organized as a unit to carry and drive separately one of the disks, and the units are severally mounted upon the blocks 18. The blocks 18 are bifurcated and are mounted to slide upon pairs of guide rods 20 that are carried by and extend inward from the flange 17. The motor 19 with its disk 3 is immediately mounted upon a medial portion 21 of the block 18 that extends bridge-like between and integrates the furcations of the block. Springs 22 tend to drive the blocks 18 inward and so to advance the severing disks 3 to and to hold them yieldingly to engagement with the work.

The means for effecting periodic recession of the disks from engagement with the work are found in slides 23 that are arranged to move in radial direction in guideways formed by and between the furcations of blocks 18. These slides 23 are provided with abutments 24, upon outer surfaces of which pins 25 borne by blocks 18 (and specifically by the medial, bridge-like portions 21 thereof) make bearing. The pins 25 are adjustable as indicated, so that the blocks 18, and with them the disks 3, impelled by springs 22 toward the axis of shaft rotation, may be minutely adjusted, relatively to slides 23, and the range of advance of the clustered disks accurately predetermined. The slides 23 are backed by springs 26 that tend to drive them radially toward the axis of shaft rotation.

Exteriorly upon and in the median portion of the length of the hollow shaft 15 a ring 27 is rotatably mounted, and from the ring fingers 28 (shown to be formed integrally with the ring) extend longitudinally of the shaft, in the direction (as seen in Fig. X) from right to left. The fingers 28 extend through orifices 28a formed for them in the annulus 16. The fingers 28 at their tips and the slides 23 at their inner ends make engagement over obliquely disposed surfaces; and, with reference to Fig. X, it will be perceived that as ring 27 is shifted to the left disks 3 are caused to recede, while the shifting of the ring 27 to the right allows the disks under spring impulsion to advance and to attack the work. Fig. X actually shows the disks in their positions of recession.

The ring 27 makes gimbal joint with a bifurcated arm 29 that extends from a shaft 30, rotatably mounted in the carriage 4 (cf. Figs. XIV and XV). The shaft 30 is provided with a drive arm 31 that is engaged by a groove in a block 32. The block 32 is mounted in the bed or frame of the machine and is reciprocable in its mounting, in right-and-left direction as seen in Fig. XIV, which is the up-and-down direction indicated by arrows in Fig. XV. A spring 33 tends constantly to shift the ring 27 to the right (Fig. X), with the fingers 28 retracted; and such position allows the disks 3 to advance and to attack the work. A bell-crank lever 34, mounted in the bed of the machine, in its range of swing, shifts the block 32 in the direction indicated.

The disk 12 already described, the disk which by its rotation effects reciprocation of the carriage 4, carries additionally on its face an incomplete circumferential track 35, and the power arm of the bell-crank lever 34 is so arranged that in the rotation of disk 12 track 35 alternately, by engagement with the lever 34, swings it (counter-clockwise, Fig. XIV) and releases it again. By such means, it will be perceived that, with each rotation of disk 12, the tool carriage 4 makes one complete forward-and-back stroke, and at the same time the disks advance to work-engaging position and recede again; and it will be understood that it is during the advance of the carriage with the work that the disks are free to advance and do advance under spring tension; and that during the recession of the carriage the disks are shifted to spread-apart positions.

Fig. XIII shows in dotted lines the groove 13 and the track 35 that disk 12 bears upon its face. It shows the stud 14 at the point in groove 13 that is farthest remote from the centre of turning and the bell crank lever 34 about to be released from engagement by the track 35. The direction of turning of the disk 12 is counter-clockwise. As the disk turns the carriage advances from right to left (Fig. X) through one quarter of a complete rotation of disk 12. This is in consequence of the fact that for one quarter of its extent the groove 13 lies in a diminishing spiral, and the stud 14 is constantly approaching the centre of disk turning. During this time the bell-crank lever 34 is disengaged; it is not restrained by track 35; and, responsive to the tension of spring 33, it moves to and is held at the limit of its clockwise turning (Fig. XIV). Such movement of lever 34 is effective through shaft 30 to withdraw ring 27 and with it the fingers 28 to the right-hand end of their range (Fig. X); and, so long as the fingers 28 are so withdrawn, the springs 22 are effective to advance the disks 3 and to hold them yieldingly to the work.

When, however, by the continued counter-clockwise turning of disk 12 (Fig. XIII) the bell-crank lever 34 is engaged by the rail 35, the ring 27 is shifted to the left (Fig. X) and, by the wedging action of the fingers 28 upon the slides 23, the disks are retracted from the work. At the same time the advance of the disk 12 causes the stud 14 to traverse the widening spiral portion of groove 13. The extent of rail 35 and of the widening spiral portion just alluded to of the groove 13 extend through three-quarters of a circumference. By such means the stud 14 is carried to its initial position (Fig. XIII), thus effecting recession of the carriage from left to right (Fig. X), and throughout such recession the bell-crank lever is held at the limit of its counter-clockwise turning (Fig. XIV) and the fingers 28 advanced, to hold the disks 3 apart and remote from the work. Continued rotation of disk 12 effects repetition of the cycle of movements described.

It is manifest that variation in the shape and proportions of the cam groove 13 in disk 21 will afford variation in the speed and periodicity of carriage travel in its advance and recession, with the effect that the machine is adapted to sever various uniform lengths from the advancing work.

The annulus 16 carries on its rear face contact bands 36 adapted to be engaged by brushes 60 (Fig. IX); and by such means it will be understood that the disk-driving motors may be constantly energized, and the disks maintained in constant and uniform rotation.

Provision is made that, during the right-to-left advance of carriage 4 (Fig. X), the hollow shaft 15, carrying the cluster of disks 3, shall rotate, to the end that each disk shall, throughout the appropriate fraction of a circumference (in this case 180°) act on the work; but that, during the left-to-right recession of the carriage shaft rotation shall be arrested. A rack 37 (Figs. XV and XVI) rigidly borne by the bed or frame of the machine is engaged by a pinion 38. Pinion 38 is carried on a shaft 39 that, rotatably mounted in carriage 4, extends in a plane perpendicular to the axis of rotation of the hollow shaft 15. The shaft 39 and the shaft 15 carry intermeshed helical gear members 40 and 41, and by such means carriage advance effects rotation of the carriage-borne shaft 15. The mounting of gear member 41 upon the shaft 15, however, is indirect. The gear member 41 is formed as an annulus that itself is mounted for free turning of the shaft 15 within it. The annulus is toothed on its lateral face and the toothed face is engaged by the toothed face of a spring-backed clutch ring 42 that is keyed to shaft 15. The structure is clearly shown in Fig. X, and is manifestly such that, as carriage 4 is shifted in one direction (right to left, Fig. X), the hollow shaft 15 is rotated; but during the opposite shifting of the carriage the clutch teeth slip over one another, and the hollow shaft 15 is at rest.

In Fig. XVII we have indicated that in place of the scoring disks 3 the glass-severing instruments may be diamond-points 43 suitably mounted and adjustably mounted upon blocks 180 that are organized as are the blocks 18 of the machine as it is shown in Fig. X.

In operation the work, that in this case is shown to be a glass tube T (it might be a glass rod), continues to advance in right-to-left course, Figs. I, II, X, so long as the sprocket chains 2 and their work-engaging blocks 1 are driven by motor 6. So long as the motor 6 is driven, the carriage 4 will be reciprocated, advancing from right to left with relatively great speed during one quarter of a rotation of shaft 11 and receding at slower speed throughout the complementary three quarters of each revolution of shaft 11. So long as the carriage is advancing the work-engaging tools 3 (43) will be in engagement with the work, being driven to such engagement by the springs 22. At the same time the cluster of tools will be in planetary rotation around the axis of the work, through the effective engagement of the toothed members 41, 42 of the clutch. When, alternately, the carriage 4 is receding in left-to-right direction, the advance of the ring 27 on the hollow spindle 15 will effect the spreading of the tools so that they are free of engagement with the work. And it is only when the recession of the carriage is complete and the advance begins again that the tools close again upon the work. It is by the operation of the means described that the successive revolutions of the cutting tools, diagrammatically illustrated in Figs. III-VII, are effected. The disks 3 of Figs. I-VIII and X are in constant rotation, being driven by their constantly energized motors 19.

In order that the cluster of tools may be centered with respect to the axis of the glass tube, the severing machine is borne upon two spindles 44 whose lower ends are screw-threaded and severally engaged by nuts that are rotatable, but are secured against axial displacement, within housings 45 on the bed 46. The nuts on the two spindles are in manifest way geared in common to a cross-shaft 47, and, by rotation of the shaft in one direction or the other, the spindles may be raised or lowered, shifting the severing machine vertically. Additionally, the housings 45, with the spindles 44 and all of the mechanism borne thereby, are adjustable in the horizontal plane of the bed 46. Thus, it will be understood that the severing machine, adjustable transversely of the glass tube T both in vertical and in horizontal directions, may be brought to position with the center of the planetary movement of the tools in accurate coincidence with the axis of the advancing glass tube.

We claim as our invention:

1. In glass-fabricating machinery, means for causing a length of glass to advance in continuous course, a severing tool adapted to advance in synchronism with the advancing length of glass, means for advancing the severing tool in such synchronism, and means for impelling said tool in such advance to move in circumferential path with respect to the axis of the advancing length of glass.

2. In glass-fabricating machinery, means for causing a cylindrical length of glass to advance in continuous course, a plurality of severing tools symmetrically arranged with respect to the axis of the advancing cylindrical length of glass adapted to advance in synchronism with the advancing length of glass and in such advance to move in circular course in a plane transverse to the direction of such advance, and means for advancing the severing tools in such synchronism.

3. In a glass-fabricating machine, a rotatable and longitudinally reciprocable hollow shaft, a glass severing tool mounted upon said shaft and movable in such mounting in radial direction with respect to the axis of the shaft, and means for moving said tool toward and from the axis of the shaft in accord with the reciprocation of the shaft.

4. In glass-forming machinery the combination with a rotatable and longitudinally reciprocable hollow shaft, means for causing a cylindrical length of glass to advance in continuous course axially within the shaft, means for reciprocating the shaft and in its forward movement at equal speed with the glass, a glass severing tool borne by the shaft and movable radially with respect to the axis thereof, means tending to shift the tool toward the axis of the shaft, and means effective during the rearward movement of the shaft for rendering ineffective the said tool shifting means.

5. The structure of claim 4, together with means for intermittently rotating said shaft, such means being effective during the forward movement of the shaft.

6. The structure of claim 1, the tool being in the form of a constantly rotating disk.

7. In glass-forming machinery the combination of a rotatable and longitudinally reciprocable hollow shaft, means for causing a cylindrical length of glass to advance in continuous course axially within the tube, a glass severing tool borne by and movable upon said shaft in a direction radial with respect to the axis of the shaft, means engaging the tool and tending to advance it toward the shaft axis, movable means adapted to engage said tool and move it oppositely away from the shaft axis, a source of power, and power-transmitting means adapted to advance a length of glass, to cause the shaft to advance at uniform speed with the advancing glass and to recede again, to effect rotation of the shaft during the advance thereof, and to move the tool in direction away from the shaft axis on the recession of the shaft.

8. In a glass-fabricating machine the combination of a rotatable and longitudinally reciprocable hollow shaft, means for causing a length of glass to advance in continuous course axially through said shaft, a glass-engaging tool borne by said shaft and movable radially in its mounting in direction toward and away from the shaft axis, means engaging said tool and tending to shift it toward the shaft axis, a finger mounted upon and movable in its mounting longitudinally upon said shaft and in the range of its movement adapted to engage said tool and shift it against the tendency of the means first named in receding direction, away from the shaft axis, and means for rotating said shaft, the said shaft-rotating means and the tool-receding means being alternately effective during the advance and the recession of the shaft in its reciprocation.

9. In a glass-fabricating machine including means for causing a length of glass to advance in continuous course, a severing tool, means for advancing said tool in unison with the length of glass, and means for shifting the tool into contact with the advancing length of glass in synchronism with the intermittent advances of the tool; the improvement herein described that comprises means for imparting planetary movement to the tool while it advances with and is in contact with the advancing length of glass.

10. In a glass-fabricating machine including means for causing a length of glass to advance in continuous course, a plurality of severing tools arranged in spaced-apart relation circumferentially of the advancing length of glass, and means for advancing the tools in unison with the length of glass; the improvements herein described that comprise means for shifting the tools transversely of the axis of, and into contact with the surface of, the advancing length of glass, and means for imparting planetary movement to the tools while they advance in contact with such length of glass.

SAMUEL A. FORTER.
HAROLD H. SNYDER.